(12) United States Patent
Lehane et al.

(10) Patent No.: US 9,686,084 B2
(45) Date of Patent: Jun. 20, 2017

(54) SYSTEM AND METHOD FOR PERFORMING MULTI-ENFORCEMENT POINT CHARGING

(71) Applicant: OPENET TELECOM LTD., Dublin (IE)

(72) Inventors: Bart Lehane, Dublin (IE); Alan McNamee, Dublin (IE); Michael O'Sullivan, Kildare (IE); Max Bacik, Dublin (IE)

(73) Assignee: OPENET TELECOM LTD., Dubin (IE)

( * ) Notice: Subject to any disclaimer, the term of this patent is extended or adjusted under 35 U.S.C. 154(b) by 0 days.

(21) Appl. No.: 15/046,844

(22) Filed: Feb. 18, 2016

(65) Prior Publication Data

US 2016/0164692 A1  Jun. 9, 2016

Related U.S. Application Data

(63) Continuation of application No. 14/024,772, filed on Sep. 12, 2013, now Pat. No. 9,313,640.

(60) Provisional application No. 61/700,004, filed on Sep. 12, 2012, provisional application No. 61/718,791, filed on Oct. 26, 2012.

(51) Int. Cl.
| | |
|---|---|
| *H04M 11/00* | (2006.01) |
| *H04L 12/14* | (2006.01) |
| *H04W 4/26* | (2009.01) |
| *H04M 15/00* | (2006.01) |
| *H04W 4/24* | (2009.01) |

(52) U.S. Cl.
CPC ........ *H04L 12/1407* (2013.01); *H04M 15/60* (2013.01); *H04W 4/24* (2013.01); *H04W 4/26* (2013.01)

(58) Field of Classification Search
CPC ...... H04L 12/1407; H04W 4/24; H04W 4/26; H04M 15/60
USPC .......................................... 455/408; 370/338
See application file for complete search history.

(56) References Cited

U.S. PATENT DOCUMENTS

| | | | |
|---|---|---|---|
| 2010/0188975 A1* | 7/2010 | Raleigh ............ | G06Q 10/06375 370/230.1 |
| 2011/0275345 A1* | 11/2011 | Cai ..................... | H04L 12/1403 455/406 |
| 2014/0011472 A1 | 1/2014 | Sharma et al. | |

* cited by examiner

*Primary Examiner* — Marcos Batista
(74) *Attorney, Agent, or Firm* — The Marbury Law Group, PLLC

(57) ABSTRACT

Systems and methods for accomplishing charging operations in a communications network in which a plurality of charging and enforcement (CaE) components operate as enforcement points for a single data communication may include receiving in a server computing device usage records from a first CaE component and a second CaE component, generating correlated usage records by using a common Service Data Flow (SDF) to correlate the one or more usage records received from the first CaE component with the one or more records received from the second CaE component, and using the correlated usage records to determine a charge value that identifies correct charges to be applied.

20 Claims, 11 Drawing Sheets

US 9,686,084 B2

SYSTEM AND METHOD FOR PERFORMING MULTI-ENFORCEMENT POINT CHARGING

RELATED APPLICATIONS

This application is a continuation of U.S. patent application Ser. No. 14/024,772 titled "System and Method for Performing Multi-Enforcement Point Charging" filed Sep. 12, 2013, which claims the benefit of priority to each of U.S. Provisional Application No. 61/700,004, titled "System and Method for Performing Multi-Enforcement Point Charging" filed Sep. 12, 2012, and U.S. Provisional Application No. 61/718,791 titled "System and Method for Performing Multi-Enforcement Point Charging" filed Oct. 26, 2012, the entire contents of both which are hereby incorporated by reference for all purposes.

BACKGROUND

Wireline and wireless communication technologies have seen dramatic improvements over the past few years. Service providers now offer users a wide array of services, higher usage limits, and attractive subscription plans. Wireless dongles and embedded wireless modem cards allow users to use tablet computers, netbooks and laptops to access wireless Internet protocol (IP) and data services through wireless networks. Internet-enabled smart phones, tablets, televisions, and gaming consoles have become essential personal accessories, connecting users to friends, work, leisure activities and entertainment. Users now have more choices and expect to have access to content, data and communications at any time, in any place. As more users utilize these services, telecommunications networks must expand to meet the increase in user demand, support the array of new services and provide fast, reliable communications.

Many telecommunications networks, such as the 3GPP defined Evolved Packet Core (EPC) network, may include more than one network component that is capable of generating charging information. Therefore, there may be situations where multiple components generate charging information that is subsequently reported to one or more charging systems (e.g., online charging system, offline charging system, etc.). These components may also be capable of providing enforcement functionality.

However, the presence of multiple combined charging and enforcement components within a single telecommunications network may lead to a number of charging problems. For example, if one component charges for data that a downstream component subsequently blocks, then the user will be charged for data that he/she did not receive. In another example, if both components are charging for data, then they may double charge the user. This may be particularly problematic in the case of a traffic detection function (TDF) and a policy and charging enforcement function (PCEF), as the TDF operates at the application level (communication architecture layer 7), while a PCEF operates at the IP level (communication architecture layer 4). It may not always be possible to translate layer 7 rules to layer 4 rules or vice-versa.

Therefore, it may be necessary to co-ordinate charging information obtained from multiple enforcement points.

SUMMARY

The various embodiments include methods of charging in telecommunications networks that include multiple charging and enforcement (CaE) components by receiving user traffic in a first charging and enforcement component, determining usage information associated with the received user traffic in the first charging and enforcement component, sending the usage information associated with the received user traffic from the first charging and enforcement component to a charging system component, sending the user traffic and the usage information associated with the received user traffic to a second charging and enforcement component, receiving the user traffic and the usage information associated with the received user traffic in the second charging and enforcement component, determining updated usage information in the second charging and enforcement component based on the received usage information and the received user traffic, and sending the updated usage information from the second charging and enforcement component to the charging system component.

In an embodiment, the first charging and enforcement component may be traffic detection function component and the second charging and enforcement component may be a policy and charging enforcement function component. In another embodiment, the first charging and enforcement component may be a policy and charging enforcement function component and the second charging and enforcement component may be a traffic detection function component.

In a further embodiment, the usage information may include charging information. In a further embodiment, sending the usage information associated with the received user traffic to a second charging and enforcement component may include labeling the user traffic with usage information. In a further embodiment, sending the usage information associated with the received user traffic to a second charging and enforcement component may include routing the user traffic based on the usage information. In a further embodiment, sending the usage information associated with the received user traffic to a second charging and enforcement component may include sending the user traffic over multiple VLANs based on the usage information.

In a further embodiment, determining updated usage information in the second charging and enforcement component based on the received usage information and the received user traffic may include adjusting the usage information with usage information received from the first charging and enforcement component.

In a further embodiment, determining updated usage information in the second charging and enforcement component based on the received usage information and the received user traffic may include performing gating operations on the received user traffic. In a further embodiment, the first charging and enforcement component and the second charging and enforcement component may be configured to operate at different communication architecture layers. In a further embodiment, the first charging and enforcement component may be configured to operate at an application layer or level, and the second charging and enforcement component may be configured to operate at an Internet protocol layer or level.

In a further embodiment, sending the user traffic and the usage information associated with the received user traffic to a second charging and enforcement component may include the first charging and enforcement component sending an indication to the second charging and enforcement component that the first charging and enforcement component will soon request additional credit from the charging system. In a further embodiment, the method may include sending the usage information from the second charging and enforcement component to the charging system in response to receiving the indication that the first charging and enforcement component will soon request additional credit from the charging system.

The various embodiments also include methods of charging in telecommunications networks including multiple charging and enforcement component by receiving one or more usage records from a first charging and enforcement component within the communication network, receiving one or more usage records from a second charging and enforcement component within the communication network, correlating the one or more usage records received from the first charging and enforcement component with the one or more records received from the second charging and enforcement component using a common Service Data Flow (SDF), and determining correct charges to be applied based upon the correlated usage records.

Further embodiments include a system having a first charging and enforcement server that includes a first processing core, a second charging and enforcement server that includes a second processing core, and a charging system server that includes a third processing core. The first, second and third processing cores may be configured with processor-executable instructions to perform various operations corresponding to the method operations discussed above.

Further embodiments include a computing device, such as a server or router, that includes a processor configured with processor-executable instructions to perform various operations corresponding to the methods discussed above.

Further embodiments include a computing device that includes various means for performing functions corresponding to the method operations discussed above.

Further embodiments include a non-transitory processor-readable storage medium on which is stored processor-executable instructions configured to cause a processor to perform various operations corresponding to the method operations discussed above.

BRIEF DESCRIPTION OF THE DRAWINGS

The accompanying drawings, which are incorporated herein and constitute part of this specification, illustrate exemplary embodiment aspects of the invention, and together with the general description given above and the detailed description given below, serve to explain the features of the invention.

DESCRIPTION

Figure 1:
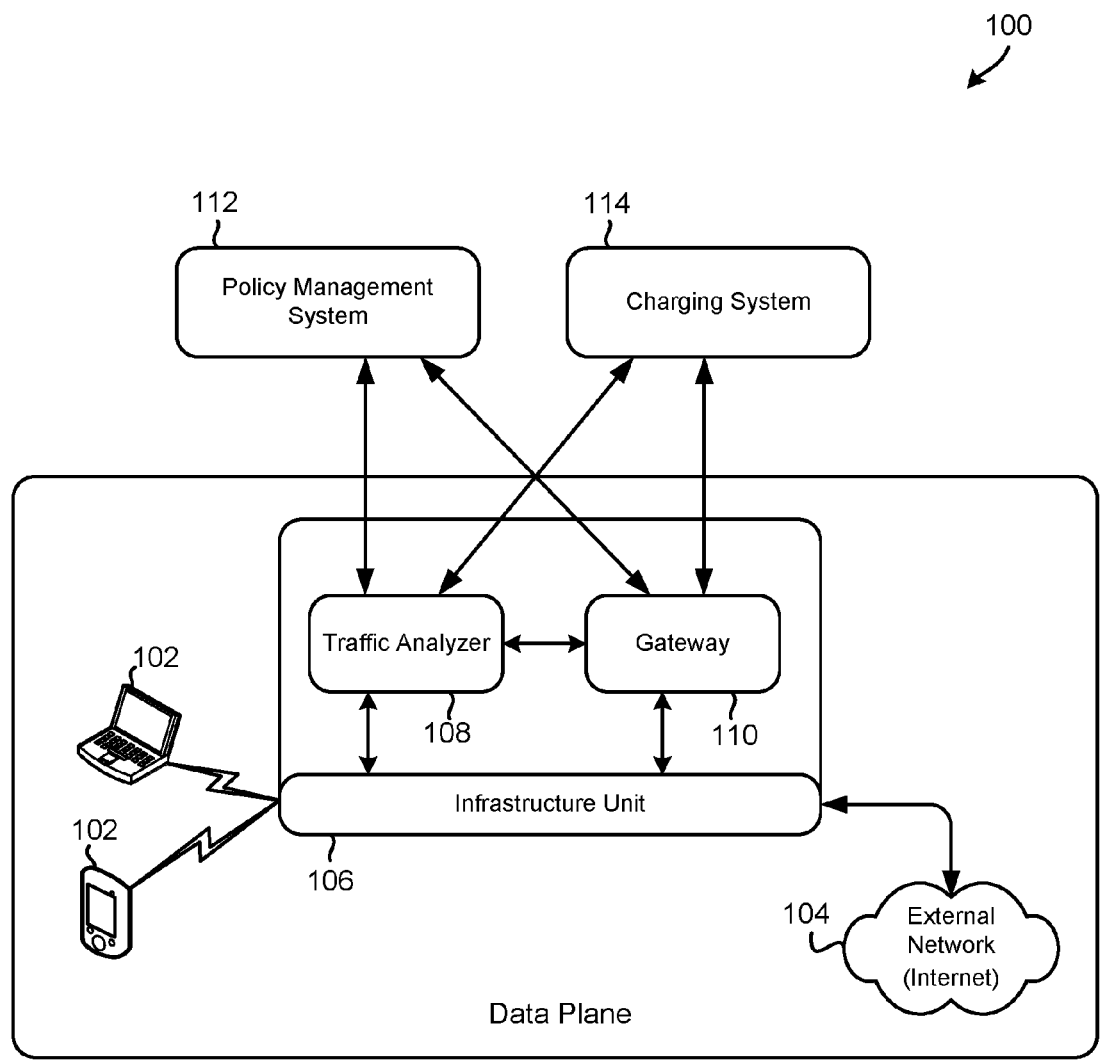
FIG. 1 is a system block diagram illustrating a telecommunications system suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used in this application, the terms "component," "module," "node," "system," and the like are intended to include a computer-related entity, such as, but not limited to, hardware, firmware, a combination of hardware and software, software, or software in execution, which is configured to perform particular operations or functions. For example, a component may be, but is not limited to, a process running on a processor, a processor, an object, an executable, a thread of execution, a program, a computing device, and/or a computing system.

The term "user equipment (UE)" is used herein to refer to any one of various cellular telephones, smart-phones (e.g., iPhone®), personal data assistants (PDA's), palm-top computers, tablet computers, laptop computers, wireless electronic mail receivers (e.g., Blackberry®, etc.), VoIP phones, wire-line devices, devices implementing Machine-to-Machine (M2M) technologies, multimedia/Internet enabled cellular telephones, and similar electronic devices capable of sending and receiving wireless communication signals. User equipment devices may include a programmable processor, memory, communication circuitry suitable for wirelessly sending and receiving information via a cellular telephone communications network.

Generally, telecommunication networks include a plurality of nodes, systems and/or components that are each responsible for providing or implementing a specific functionally for that network. For example, modern telecommunication networks typically include a charging system, a policy management system, and an enforcement component. The charging system is generally responsible for storing and managing a subscriber's billing and/or charging information. The policy management system is generally responsible for determining policy rules for controlling the bandwidth, the quality of service (QoS), and other characteristics of the communications between the network and user equipment. For example, the policy management system may generate and send policy and charging control (PCC) rules to the enforcement component for implementation. The enforcement component may implement or enforce these rules by querying, coordinating, removing, revoking and/or adjusting various resources (e.g., network resources, subscriber resources, etc.) or performing other similar operations to control the services, QoS, and/or bandwidth that are made available to a particular subscriber.

The enforcement component may serve as the primary enforcement point, gateway and a routing mechanism between the Internet and the radio infrastructure/radio access network, and ultimately the user equipment. An enforcement point is any network component that can modify the information flows, data traffic, and/or communication messages that pass through it. Such modifications include gating, QoS control, dropping packets, guaranteeing bandwidth, etc.

The enforcement component may be a charging and enforcement ("CaE") component. That is, the enforcement component may be configured to communicate with the charging system to identify the policies that are to be enforced and/or to ensure proper billing or charging for the services used by subscribers/customers of the network. For example, the enforcement component may periodically inform the charging system of the amount of wireless data that is used by a subscriber so that the charging system may monitor the aggregate amount of data/service used by that subscriber. The enforcement component may also periodically inform the charging system of services requested by a subscriber and/or issue requests for service authorizations. The charging system may send the enforcement component a policy and charging control rule suitable for causing the enforcement component to grant or deny a user equipment device access to the network. The policy and charging control rule may grant/deny access to the network based on any of a variety of factors, such as the amount of fund, credits, or access units available in a subscriber account associated with a particular subscriber or user equipment device.

For ease of reference, enforcement components that are also charging components or charging points are referred to herein and in the claims as "charging and enforcement components" or "CaE components."

As operator networks expand to meet increased traffic and user demands, it is now becoming more common for a single network to include multiple enforcement components, and for two or more charging and enforcement ("CaE") components to control, manage, monitor, or modify a single stream, session, flow, or communication between a user equipment device and the Internet. Since each of these CaF, components may independently control a customer's access to the network/services and independently generate/report charging information for the use of the network/services, a degree of coordination or executive control is required between the CaF, components to ensure that a subscriber is not double billed for the same service and/or is not billed for a service that he/she did not receive/consume.

For example, in a system that includes a first and second charging and enforcement ("CaE") component, information or user traffic may flow from the user equipment device to the first CaE component, then to the second CaE component and finally to the Internet. In this system, each of the first and second CaF, components may independently block any portion of the information flow (or user traffic) between the user equipment device and the Internet. Further, each of the first and second CaF, components may independently generate charging information regarding the communication of the information. Thus, the first CaF, component may allow all of the user traffic or information flow, and generate charging information for that traffic/flow, and the second CaE component may subsequently block all or portions of the traffic/flow. In this scenario, the subscriber may be charged for a communication service that he/she did not receive. As another example, if both of the CaF, components allow a data communication and generate charging information for that communication, then the subscriber may be double charged for a single communication. For these and other reasons, a degree of coordination or executive control is required to ensure correct charging/billing in networks that include multiple CaE components or multiple enforcement and charging points.

In various embodiments, two or more charging and enforcement ("CaE") components may be configured to communicate usage and/or charging information that is suitable for use by each CaE component in determining whether a subscriber has been charged by another charging or enforcement point for a service, information flow, communication, or packet. The receiving CaF, component may use this usage/charging information to better determine how to charge a subscriber for the access and use of the network/services. The receiving CaE component may also use this information to better determine whether a communication packet should be blocked.

Two or more charging and enforcement (CaE) components in the same network may operate at different communication architecture layers or levels (i.e., application level vs. IP level), and the translation of the information between the different levels may be challenging, slow, processor intensive or otherwise consume an excessive amount of processing, memory, or communication resources of the components. Therefore, in an embodiment, the CaF, components may be configured to communicate charging information at the IP level (i.e., layer 4).

Two or more charging and enforcement (CaE) components in the same network may operate at different communication architecture layers or levels (i.e., application level vs. IP level). That is, the first CaE component may be configured to operate at an application layer and the second CaE component may be configured to operate at an Internet protocol (IP) layer. In such configurations, the translation of the information between the different levels may be challenging, slow, processor intensive or otherwise consume an excessive amount of processing, memory, or communication resources of the components. To overcome these challenges, in an embodiment, the CaE components may be configured to communicate charging information at the IP level (i.e., layer 4).

In an embodiment, the charging and enforcement (CaE) components may be configured to communicate charging information by marking the information packets that are communicated to and from a user equipment device. For example, a first CaF, component may be configured to mark the packets for which it reported charging information so that the second (or subsequent) enforcement point or CaF, component is aware of the packets for which the subscriber/customer has already been charged.

In an embodiment, the charging and enforcement (CaE) components may be configured to communicate charging information by communicating information packets via specific ports. For example, a first CaE component may be configured to send packets for which it reported charging information to a first port in a second enforcement component, and packets for which it has not yet reported charging information to a second port in the second enforcement component.

In an embodiment, the charging and enforcement (CaE) components may be configured to communicate charging information by communicating information packets via specific virtual local area networks (VLANs). For example, a first CaF, component may be configured to send packets for which it reported charging information to a second enforcement component via a first VLAN, and send packets for which it has not yet reported charging information via a second VLAN.

Various embodiments may include a network component configured to receive a usage records from a first charging and enforcement (CaE) component, receive usage records from a second charging and enforcement component, correlate the usage records received from the first charging and enforcement component with the records received from the second charging and enforcement component using a common service data flow (SDF), and determine the charges to be applied to a subscriber account based upon the correlated usage records.

FIG. 1 illustrates an exemplary telecommunications system 100 suitable for implementing the various embodiments. A telecommunications system 100 typically includes user equipment (UE) 102 devices configured to send and receive voice, data, and control signals to and from an external network 104 (and ultimately the Internet). In the example illustrated in FIG. 1, the system 100 also includes a network infrastructure unit 106, a traffic analyzer component 108, a gateway component 110, a policy management system component 112 and a charging system component 114.

The user equipment 102 devices may be terminal equipment devices that are each owned and operated by a human user, customer, or subscriber. The external network 104 may be any network that is external to the telecommunication network domain. In an embodiment, system 100 may be a 3GPP network, and the external network 104 may be a server coupled to the Internet and/or the Internet.

The network infrastructure unit 106 encapsulates various network components/systems, each of which may implement any of a variety of communication technologies/protocols to process and route the voice, data and control signals between the external network 104 and the user equipment 102 devices. For example, the network infrastructure unit 106 may include components for implementing a cellular telephone network, a radio access network (e.g., UTRAN, RAN, etc.), WiFi network, WiMAX network, and/or other well known communication technologies (e.g., GPRS, UMTS, LTE, cdmaOne, CDMA2000™). Since these structures are well known, certain details have been omitted in order to focus the descriptions on the most relevant features.

The network infrastructure 106 unit may include connections to the traffic analyzer component 108 and the gateway component 110. The traffic analyzer component 108 may be a stand-alone deep packet inspection (DPI) component. In an embodiment, the traffic analyzer component 108 may be a traffic detection function (TDF) component configured to perform application level (i.e., layer 7) operations, including applying Application Detection and Control (ADC) rules to determine whether a communication message or packet should be blocked. In an embodiment, the traffic analyzer component 108 may be a charging and enforcement (CaE) component.

The gateway component 110 may be configured to enable, constrain, or prevent the flow of traffic between user equipment 102 devices and the external network 104. In an embodiment, the gateway component 110 may be a Gateway GPRS Support Node (GGSN). In an embodiment, the gateway component 110 may include a policy and charging enforcement function (PCEF) component, which is generally responsible for enforcing policy rules to control the bandwidth, the quality of service (QoS), and other characteristics of the communications between the network 104 and the user equipment 102. In an embodiment, the gateway component 110 may be charging and enforcement (CaE) component.

In various embodiments, each of the traffic analyzer component 108 and the gateway component 110 may be an enforcement point, a charging point, or both. In an embodiment, the traffic analyzer component 108 and a gateway component 110 may be logically positioned in the communication pathway between the mobile devices 102 and the external network 104 so that downlink traffic flows (i.e., information flows from the network 104 to a mobile device 102) are received in gateway component 110 first and in traffic analyzer component 108 second. In this embodiment, uplink traffic (i.e., information flows from the mobile device 102 to the network) flows through the traffic analyzer component 108 first and the gateway component 110 second.

In another embodiment, the traffic analyzer component 108 and the gateway component 110 may be logically positioned in the communication pathway between the mobile devices 102 and the external network 104 so that the downlink traffic flows through the traffic analyzer component 108 first and the gateway component 110 second. In this embodiment, uplink traffic flows through the gateway component 110 first and the traffic analyzer component 108 second.

The policy management system component 112 may be configured to determine policies regarding the access and usage of the network. The policy management system component 112 may send policy rules to the traffic analyzer component 108 and/or the gateway component 110 for enforcement. In the embodiment of a 3GPP network, the policy management system component may include a policy and charging rules function (PCRF) component.

The charging system component 114 may store subscriber billing and/or charging information, such as balance information for each customer/subscriber. The charging system component 114 may be configured to communicate with both the traffic analyzer component 108 and the gateway component 110, and use the information received from these components 108, 110 to access, retrieve, update or modify subscriber billing/charging information. The charging system component 114 may also be configured to send charging rules to the traffic analyzer component 108 and/or the gateway component 110 for implementation or enforcement. In the preferred embodiment of a 3GPP network, the charging system may include an online charging system (OCS).

The traffic analyzer component 108 and the gateway component 110 may be enforcement points for the same data communication, stream, session, or flow. In various embodiments, the system 100 may include any number of other or additional enforcement points. Components suitable for use as enforcement point include PCEF components, PDN-Gateway components, BBERF components, Serving-Gateway components, eNodeBs, TDF components, and other similar components that may monitor, modify, or restrict information flows, data traffic, and/or communication messages.

In an embodiment, the traffic analyzer component 108 and the gateway component 110 may be charging points for the same data communication, stream, session, or flow. A charging point may be any network component that may be configured to generate charging or usage information. In various embodiments, the system 100 may include charging trigger functions, PCEFs, TDFs, CSCFs, or any other similar node that may be configured to generate charging or usage information, and thus may operate as a charging point.

In an embodiment, a single enforcement point component may perform both charging functionality and enforcement functionality, and thus serve as both a charging point and an enforcement point. In an embodiment, each of the traffic analyzer component 108 and the gateway component 110 may be a charging point and an enforcement point.

Figure 2:
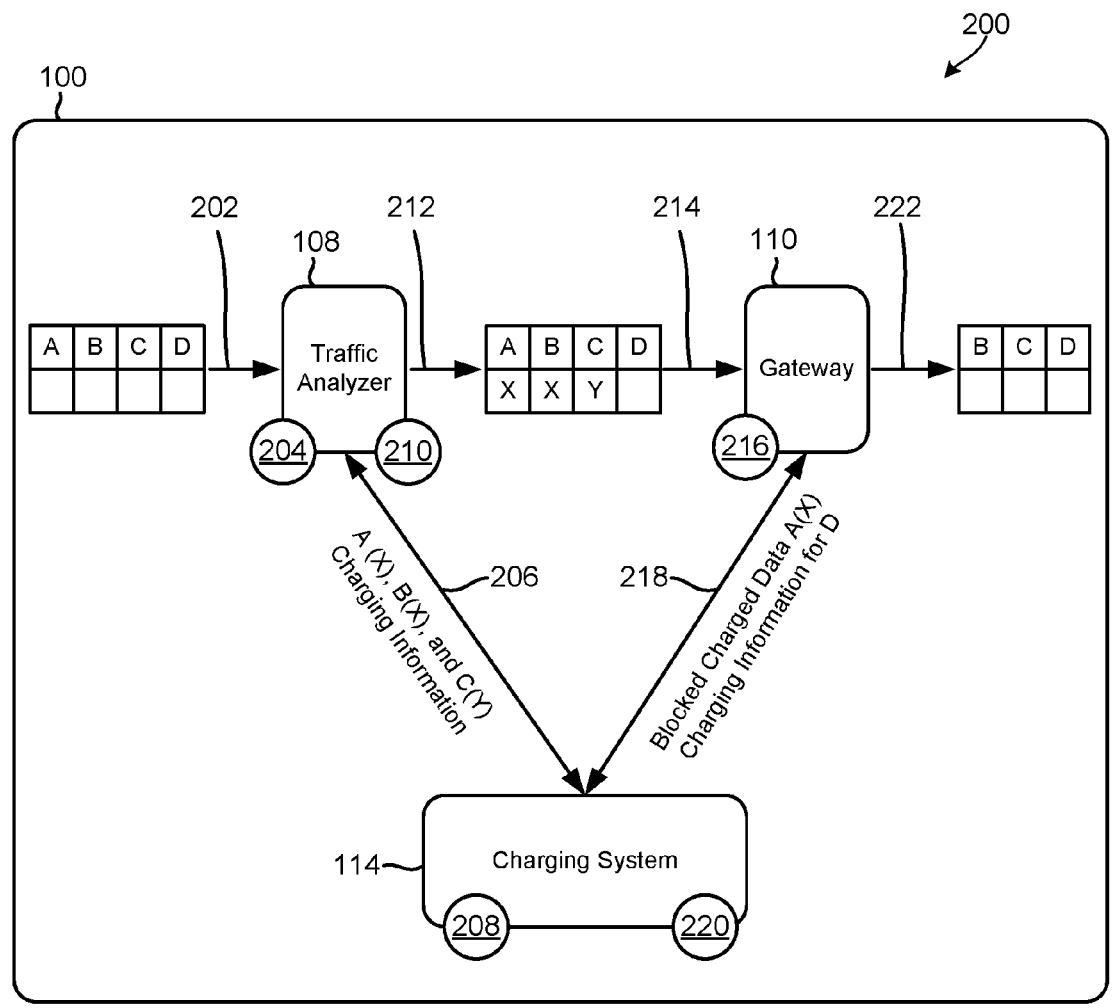
FIG. 2 is a block diagram illustrating an embodiment method of marking packets to coordinate the reporting of charging information in a telecommunication system that includes multiple charging and enforcement points.

FIG. 2 illustrates an embodiment method 200 of marking packets to coordinate the reporting of charging information in a system 100 that includes multiple enforcement points, namely a traffic analyzer component 108 and a gateway component 110. Method 200 may be performed in one or more processing cores of one or more server computing devices that implement a traffic analyzer component 108, a gateway component 110, and/or a charging system component 114.

In operation 202, the traffic analyzer component 108 may receive packets (A, B, C, and D) from a user equipment device or a server in the Internet. In operation 204, the traffic analyzer component 108 may perform application level operations (i.e., layer 7 operations) to determine whether any of the received packets (A, B, C, and D) should be blocked. Also in operation 204, the traffic analyzer component 108 may determine that the subscriber/customer should be charged for packets A, B and C.

In the example illustrated in FIG. 2, the traffic analyzer component 108 determines that none of the four packets (A, B, C, and D) should to be blocked, that packets A and B should be associated with a first charging identifier (X), and that packet C should be associated with a different charging identifier (Y) in operation 204.

In operation 206, the traffic analyzer component 108 may send the usage and charging information for packets A, B and C to the charging system 114. The traffic analyzer component 108 and the charging system 114 may also communicate other information for reporting of the usage of the network or services, obtaining quotas, and/or performing any other online charging management operation. In operation 208, the charging system may charge the subscriber/customer for packets A, B and C.

In operation 210, the traffic analyzer component 108 may perform packet marking operations to mark the "charged-for" packets (i.e., packets A, B and C) with a charging identifier (i.e., X or Y). That is, in operation 210, the traffic analyzer component 108 may associate the packets for which it has sent charging information to the charging system 114 (i.e., the "charged-for" packets A, B, and C) with a charging identifier (i.e., X or Y). In an embodiment, the charging identifiers may be customizable. In various embodiments, a single charging identifier may used to identify all the "charged-for packets" or multiple charging identifiers may be used to identify the packets for which charging information has been reported. In various embodiments, marking or associating the packets with charging information may include marking IP packets by using optional, custom, or additional packet headers, marking GTP packets by using customized GTP header information, or by using any other protocol where packet headers may be marked with a charging identifier.

In the example illustrated in FIG. 2, the traffic analyzer component 108 marks packets A and B with charging identifier X, and marks packet C with charging identifier Y in operation 210. In operation 212, the traffic analyzer component 108 may communicate all the packets (i.e., packets A, B, C, and D) to the gateway component 110.

In operation 214, the gateway component 110 may receive the packets sent by the traffic analyzer component 108. In operation 216, the gateway component 110 may use the charging identifiers (X, Y) associated with the marked packets (i.e., packets A, B, and C) to determine that the subscriber/customer has been charged for packets A, B, and C. The gateway component 110 may also determine that the subscriber/customer has not yet been charged for packet D due to packet D not being marked or associated with a charging identifier. In an embodiment, the gateway component 110 may also be configured to determine that the subscriber/customer has not yet been charged for packet D based on the type of charging identifier that is associated with the packet (e.g., packets associated with charging identifier "Z" have not been charged).

Also in operation 216, the gateway component 110 may implement or enforce policy and charging control rules on the received packets (A, B, C, and D) to determine that packet A should be dropped/blocked. The gateway component 110 may use the charging identifier (X) associated with packet A to determine that the traffic analyzer component 108 has previously charged subscriber/customer for the services associated with the communication of packet A, but will not receive the benefits of such services due to the gateway component 110 dropping/blocking packet A.

In operation 218 the gateway component 110 may send a communication message to the charging system 114 to notify it that packet A was dropped. The gateway component 110 may include the charging identifier (X) associated with the dropped packet (i.e., packet A) in the communication message that is sent to the charging system 114. This may cause the charging system 114 to not charge the subscriber for the service associated with packet A, to refund the subscriber for amounts charged for the communication of packet A in operation 208, and/or to perform other similar operations to ensure the correct billing for the services received by the subscriber.

In operation 218, the gateway component 110 may report charging information for packet D to the charging system 114. For example, the gateway component 110 may determine that packet D is not marked and thus the subscriber should be charged for packet D. As another example, gateway component 110 may determine that packet D is marked with a charging identifier that indicates the subscriber should be charged. For example, the gateway component may determine the packets marked with charging identifier 'Z,' and that this charging identifier indicates that the subscriber has not yet been charged for this packet. As yet another example, the gateway component 110 may determine that packet D is marked with charging identifier 'Z,' and send the charging identifier to the charging system 114. In any case, the charging system 114 may receive this information, and increase or decrease subscriber balances as appropriate. In doing so, the charging system 114 may take into account all the information that it receives from both the traffic analyzer component 108 and the gateway component 110.

In operation 220, the charging system 114 may perform various operations to correct any identified charging inconsistencies. For example, the charging system may update the subscriber/customer's balance to include a refund for packets that were subsequently blocked. In operation 222, the gateway component may send packets B, C, and D to the external network 104 or to the user equipment 102 device.

It should be understood that similar operations may be performed in both the downlink and uplink directions. For example, the gateway component 110 may be configured to mark the packets, and the traffic analyzer component 108 may be configured to inform the charging system 114 of packets for which the subscriber has previously been charged and which have been subsequently blocked.

Packet marking may not be natively supported in certain types of networks or network configurations. For example, although a Differentiated Services Code Point (DSCP) attribute can be used for IPv4 packet marking in some configurations, it is not always available or possible to use. IPv4 packet marking becomes challenging in many scenarios and circumstances. To overcome this, various embodiment components may be configured to tunnel the original packets into a different packet type with headers that can be marked with the necessary charging information. For example, IPv4 packets may be tunneled into IPv6 packets (e.g. using the tunneling mechanism proposed in RFC 2473, or any other similar tunneling mechanism). IPv6 packets may be marked using one or more of the IPv6 fixed headers and/or the optional IPv6 extension headers. When the IPv6 packets are subsequently decapsulated, both the IPv6 fixed headers and the optional IPv6 extension headers may be examined for charging identifiers.

The various embodiments may include an enforcement component configured to modify or replace existing charging information generated by another enforcement component. For example, the gateway component 110 (e.g., a PCEF component) may report charging information for a video stream based on packet-based usage charging, and the traffic analyzer component 108 may subsequently compute and report charging information for that same video stream based on a single application level charge for watching films. In this scenario, the traffic analyzer component 108 and/or charging system component 114 may be configured to modify or replace the existing charging information generated by gateway the component 110 so as to prevent billing/charging the subscriber/customer twice (or differently) for the same service.

In an embodiment, the enforcement components may be configured so that charging information may be communicated via a configurable routing setup based on IP information, such as ports. In this embodiment, the first enforcement component may be configured to route packets to the second enforcement component based on charging rules or polices applied by the first enforcement component.

Figure 3:
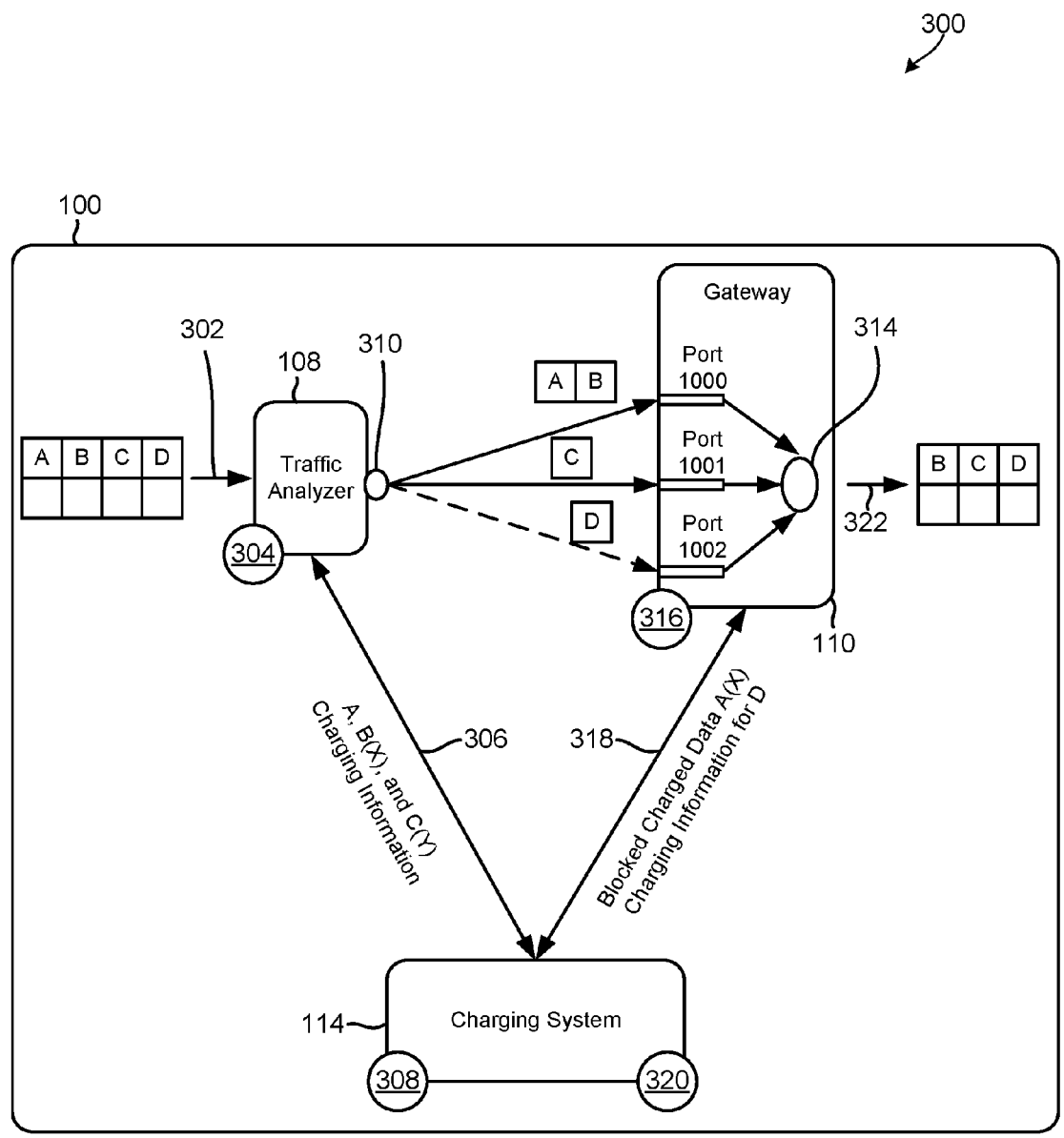
FIG. 3 is a block diagram illustrating an embodiment method of using ports to coordinate the reporting of charging information in a telecommunication system that includes multiple charging and enforcement points.

FIG. 3 illustrates an embodiment method 300 of using ports to coordinate the reporting of charging information in a system 100 that includes multiple enforcement points. Method 300 may be performed in one or more processing cores of one or more server computing devices that implement a traffic analyzer component 108, a gateway component 110, and/or a charging system component 114. Method 300 is described with reference to configurable ports that differentiate between the packets. In addition to configurable ports, various embodiments may accomplish one or more functions of method 300 via the use of different IP addresses on a single gateway component 110, multiple instances (virtual or otherwise) of gateway component 110, or via the performance of any other differentiated routing method.

In operation 302, the traffic analyzer component 108 may receive packets (A, B, C, and D) from a user equipment device or a server in the Internet. In operation 304, the traffic analyzer component 108 may perform application level operations (i.e., layer 7 operations) to determine whether any of the received packets (A, B, C, and D) should be blocked and/or whether a subscriber should be charged for communication of the packets.

In the example illustrated in FIG. 3, the traffic analyzer component 108 determines that none of the four packets (A, B, C, and D) should to be blocked, that the subscriber/customer should be charged for packets A, B and C, that packets A and B should be associated with a first charging identifier (X), and that packet C should be associated with a different charging identifier (Y) in operation 304.

In operation 306, the traffic analyzer component 108 may send the charging information for packets A, B and C to the charging system 114. In operation 308, the charging system may charge the subscriber for packets A, B and C. In operation 310, the traffic analyzer component 108 may send all the packets (i.e., packets A and B) that are marked with the first charging identifier (i.e., X) to a first port (e.g., port 1000) of the gateway component 110, all the packets (i.e., packet C) that are marked with the second charging identifier (i.e., Y) to a second port (e.g., port 1001) of the gateway component 110, etc. As part of operation 310, the traffic analyzer component 108 may also send all the unmarked packets (i.e., packet D) to a specific port (e.g., port 1002). In various embodiments, these ports and their associated charging identifiers may be pre-installed in the enforcement components, negotiated in advance, negotiated before the communication, etc.

In operation 314, the gateway component 110 may receive the packets sent by the traffic analyzer component 108, and determine a charging identifier for each of the received packets based on the port. For example, the gateway component 110 may determine that all packets received via the first port (e.g., port 1000) were charged using a first charging identifier (e.g., X), all packets received via the second port (e.g., port 1001) were charged using a second charging identifier (e.g., Y), etc. Similarly, the gateway component 110 may be configured to determine that all packets received via a specific port (e.g., port 1002) were not charged.

In operation 316, the gateway component 110 may use the charging identifiers (X, Y) and/or port information to determine that the subscriber has been charged for packets A, B, C, that the subscriber has not been charged for packet D, and determine that packet A should be dropped/blocked based on enforcing policy and charging control rules on the received packets. As part of operation 316, the gateway component 110 may determine that the traffic analyzer component 108 has previously charged subscriber/customer for the services associated with the communication of packet A, but will not receive the benefits of such services due to the gateway component 110 dropping/blocking packet A.

In operation 318 the gateway component 110 may send a communication message to the charging system 114 to notify it that packet A was dropped and/or to cause the charging system 114 to not charge the subscriber for the service associated with packet A, to refund the subscriber for amounts charged for the communication of packet A, or to perform other similar billing or charging operations. In operation 320, the charging system 114 may increase or decrease subscriber balances based on the information received from the gateway component 110 and/or traffic analyzer component 108 or may perform various operations to correct any identified charging inconsistencies. In operation 322, the gateway component 110 may send packets B, C, and D to the external network 104 or to the user equipment 102 device.

In an alternative embodiment, charging information may be exchanged between the first enforcement point and the second enforcement point by using multiple virtual local area networks (VLANs) to differentiate packets associated with different charging identifiers.

Figure 4:
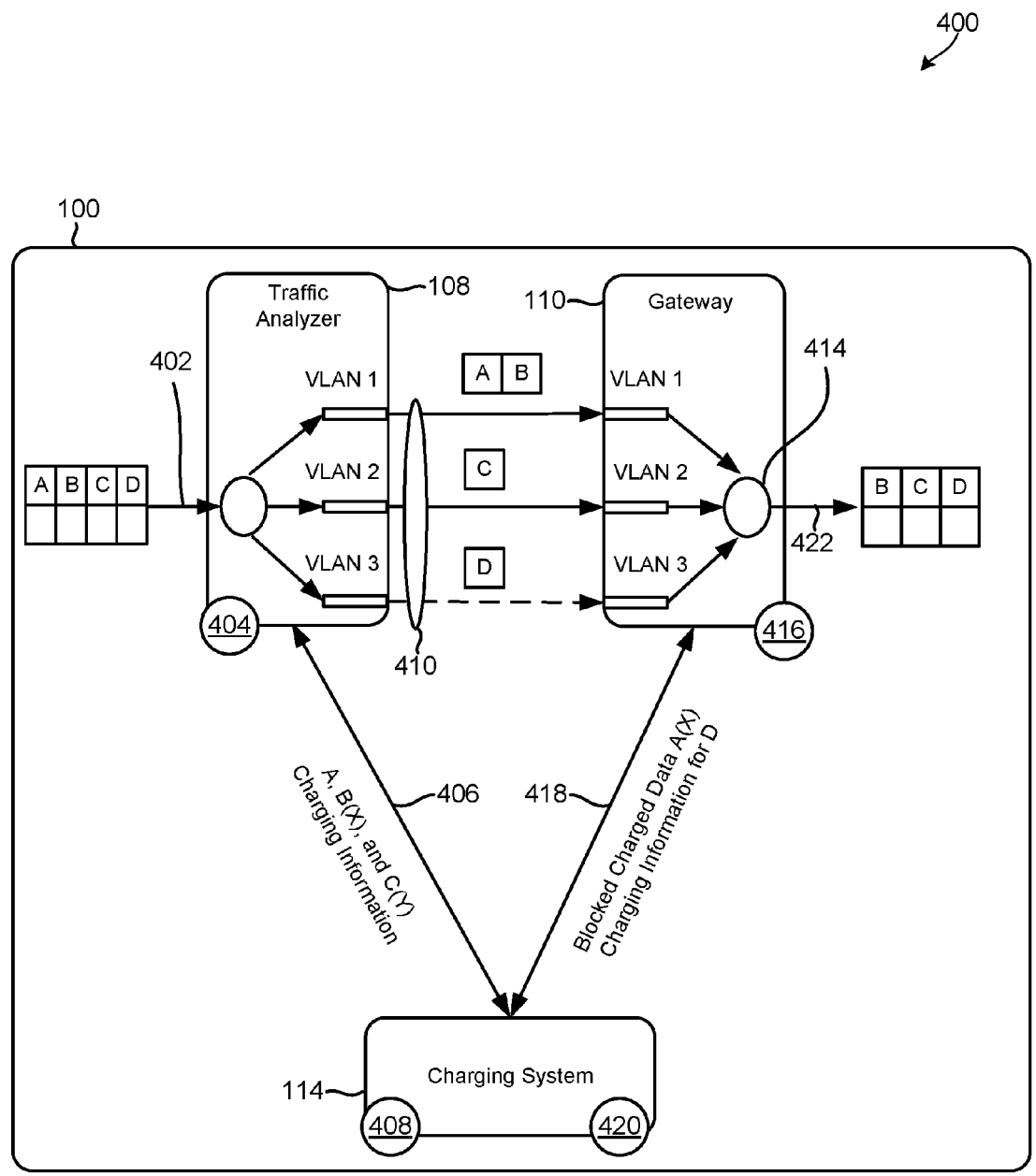
FIG. 4 is a block diagram illustrating an embodiment method of using multiple virtual local area networks (VLANs) to coordinate the reporting of charging information in a telecommunication system that includes multiple charging and enforcement points.

FIG. 4 illustrates an embodiment method 400 of using multiple virtual local area networks (VLANs) to coordinate the reporting of charging information in a system 100 that includes multiple enforcement points. Method 400 may be performed in one or more processing cores of one or more server computing devices that implement a traffic analyzer component 108, a gateway component 110, and/or a charging system component 114.

In operation 402, the traffic analyzer component 108 may receive packets (A, B, C, and D) from a user equipment device or a server in the Internet. In operation 404, the traffic analyzer component 108 may perform application level operations to determine whether any of the received packets (A, B, C, and D) should be blocked and/or whether a subscriber should be charged for communication of the packets. In the example illustrated in FIG. 4, the traffic analyzer component 108 determines that none of the four packets (A, B, C, and D) should to be blocked, that the subscriber/customer should be charged for packets A, B and C, that packets A and B should be associated with a first charging identifier (X), and that packet C should be associated with a different charging identifier (Y) in operation 404. In operation 406, the traffic analyzer component 108 may send the charging information for packets A, B and C to the charging system 114. In operation 408, the charging system may charge the subscriber for packets A, B and C.

In operation 410, the traffic analyzer component 108 may send the packets corresponding to a first charging identifier (e.g., X) to a defined VLAN (i.e., VLAN 1) of the gateway component 110, send packets corresponding to a second charging identifier (e.g., Y) to another defined VLAN (i.e., VLAN 2) in the gateway component 110, etc.

In operation 414, the gateway component 110 may receive the packets sent by the traffic analyzer component 108, and determine a charging identifier for each of the received packets based on the VLAN in which they were received. For example, the gateway component 110 may determine that all packets received via the first VLAN (e.g., VLAN 1) were charged using a first charging identifier (e.g., X), all packets received via the second VLAN (e.g., VLAN 2) were charged using a second charging identifier (e.g., Y), etc. Similarly, the gateway component 110 may be configured to determine that all packets received via a specific VLAN (e.g., VLAN 3) were not charged.

In operation 416, the gateway component 110 may use the charging identifiers (X, Y) and/or VLAN information to determine that the subscriber has been charged for packets A, B, C, that the subscriber has not been charged for packet D, and determine that packet A should be dropped/blocked based on enforcing policy and charging control rules on the received packets. As part of operation 416, the gateway component 110 may determine that the traffic analyzer component 108 has previously charged subscriber/customer for the services associated with the communication of packet A, but will not receive the benefits of such services due to the gateway component 110 dropping/blocking packet A.

In operation 418 the gateway component 110 may send a communication message to the charging system 114 to notify it that packet A was dropped and/or to cause the charging system 114 to not charge the subscriber for the service associated with packet A, to refund the subscriber for amounts charged for the communication of packet A, or to perform other similar billing or charging operations. In operation 420, the charging system 114 may increase or decrease subscriber balances based on the information received from the gateway component 110 and/or traffic analyzer component 108 or may perform various operations to correct any identified charging inconsistencies. In operation 422, the gateway component 110 may send packets B, C, and D to the external network 104 or to the user equipment 102 device.

The various embodiments include a charging system component 114 configured to receive information from multiple enforcement components, such as from a gateway component 110 and a traffic analyzer component 108.

Various embodiments may also include a gateway component 110 and a traffic analyzer component 108 configured to send information to the charging system component 114. For example, in a downlink flow, traffic analyzer component 108 may be configured to report usage information and the gateway component 110 may be configured to report usage information, as well as information on the packets that were previously charged for and are now being discarded. Similarly, in an uplink flow, the gateway component 110 may be configured to report usage information, and the traffic analyzer component 108 may report usage information as well as information on the packets that were previously charged for and are now being discarded.

The charging system component 114 may be configured to decrement subscriber balances using a similar procedure as that which is used when there are two online charging interfaces. For example, the charging system component 114 may issue quota or decrement balances based on both interfaces simultaneously.

There may be a scenario in which the first enforcement component (e.g., traffic analyzer component 108) decrements the balance for a packet that the subscriber was previously charged for and which is now being discarded, yet the second enforcement points has not yet informed the charging system 114 about the packet. In this scenario, there will be a temporary discrepancy between the amounts that the subscriber has actually used, and the amounts that the charging system 114 knows, stores, or can compute that subscriber has used. The risk of this discrepancy may be mitigated in a number of ways including: increasing the reporting frequency of refund information (i.e. information relating to packets that were previously charged for and are now being discarded); configuring both enforcement points to report in a synchronized manner (e.g. after a fixed number of packets); enabling the charging system 114 to retrieve refund information from one enforcement point when processing a credit request from another enforcement point; and using additional packet marking to indicate when one enforcement point is about to request credit so that the other enforcement point can immediately send the refund information to the charging system 114.

The various embodiments may enable the configuration of charging information between the two enforcement points to be performed statically and/or dynamically. For example, in embodiments that exchange charging information using multiple VLANs, charging identifiers associated with each VLAN may be configured statically on both the traffic analyzer component 108 and the gateway component 110, may be dynamically set for each session (e.g., an IP-CAN session), or may have standard default values which can be modified on a per session basis. The charging information may also be configured similarly for embodiments using packet marking and configurable routing.

In an embodiment using static configuration, each enforcement point may be pre-configured to associate each charging identifier with a resource or behavior (e.g., a packet mark, a packet route, a VLAN, etc.).

In an embodiment using dynamic configuration, each enforcement point may be provided with a mapping of charging identifiers to resources or behaviors (e.g., packet marks, packet routes, VLANs, etc.) at the beginning of the session. For example, VLAN 1 could correspond to charging identifier X for one session and charging identifier Y for a different session.

In an enhanced embodiment using dynamic configuration, each enforcement component may be provided with a default mapping of charging identifiers to resources or behaviors (e.g. packet marks, packet routes, VLANs), and these default values may be modified at the beginning of the session only when necessary. The dynamic updates to the configuration may be provided to the enforcement components by either the charging system 114 or the policy management system 112.

Figure 5:
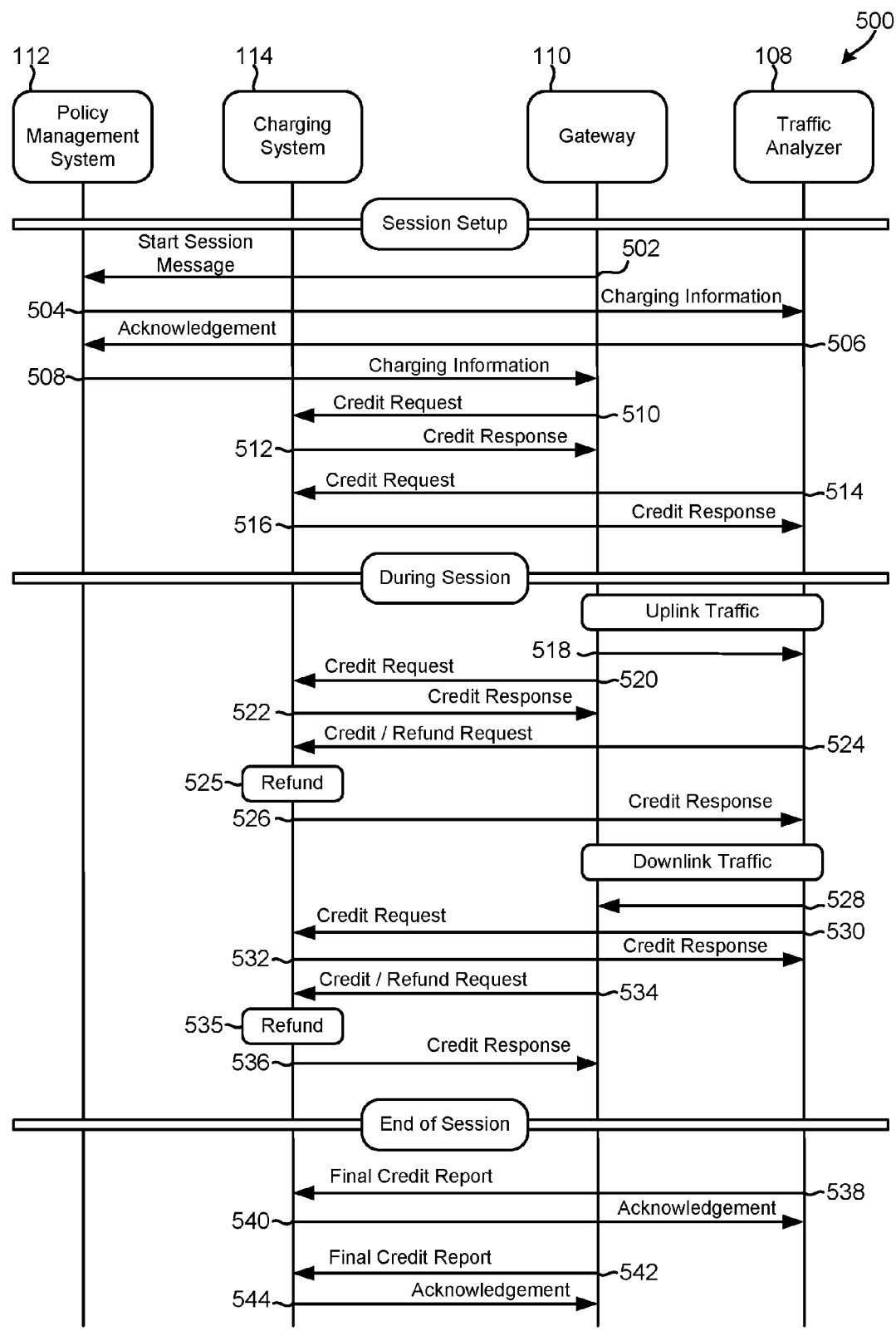
FIG. 5 is a message flow diagram illustrating an embodiment method of exchanging charging information in a telecommunication system that includes two charging and enforcement points.

FIG. 5 illustrates an embodiment method 500 of exchanging charging information in a network that includes two enforcement components (i.e., a traffic analyzer component 108 and a gateway component 110), a policy management system component 112, and a charging system component 114. Method 500 may be performed in one or more processing cores of one or more server computing devices that implement a traffic analyzer component 108, a gateway component 110, and/or a charging system component 114.

In operation 502, the session may begin with the gateway component 110 sending a start session message to the policy management system component 112. In operation 504, the policy management system component 112 may start a session with the traffic analyzer component 108, and pass charging information that includes charging identifiers and any dynamic mappings that are applicable (e.g. charging identifiers to packet marks, packet routes, VLANs) to the traffic analyzer component 108. In operation 506, the traffic analyzer component 108 may respond with an acknowledgement. In operation 508, the policy management system component 112 may return charging information to the gateway component 110, including charging identifiers and dynamic mappings.

In operation 510, the gateway component 110 may activate the online charging session and send a credit request to the charging system 114. In operation 512, the charging system 114 may provide credit to the gateway component 110. In operation 514, the traffic analyzer component 108 may activate a separate online charging session and request credit from the charging system 114. In operation 516, the charging system 114 may provide credit to the traffic analyzer component 108.

In operation 518, the uplink user data plane packets may travel from the gateway component 110 to the traffic analyzer component 108 in a manner such that it can be associated with the appropriate charging identifiers (e.g. using packet marking, configurable routing, or multiple VLANs). In operation 520, the gateway component 110 may continue to charge for uplink data and continues to request credit from the charging system 114. In operation 522, the charging system 114 may continue to allocate credit to the gateway component 110. In operation 524, the traffic analyzer component 108 may continue to charge for uplink data and continues to request credit from the charging system 114. If the traffic analyzer component 108 determines that some dropped packets have previously been charged for at the gateway component 110, then it may initiate a refund of used data to the charging system 114. In operation 525, the charging system 114 may refund the customer/subscriber for any dropped packets that have been charged. In operation 526, the charging system 114 may continue to grant credit to the traffic analyzer component 108 (and processes any refunds).

In operation 528, the downlink user data plane packets may travel from the traffic analyzer component 108 to the gateway component 110 in a manner such that it can be associated with the appropriate charging identifiers (e.g. using packet marking, configurable routing, or multiple VLANs). In operation 530, the traffic analyzer component 108 may continue to charge for downlink data and continues to request credit from the charging system 114. In operation 532, the charging system 114 may continue to allocate credit to the traffic analyzer component 108. In operation 534, the gateway component 110 may continue to charge for downlink data and continue to request credit from the charging system 114. If the gateway component 110 determines that some dropped packets have previously been charged for at the traffic analyzer component 108, the gateway component 110 may initiate a refund of used data to the charging system 114. In operation 535, the charging system 114 may refund the customer/subscriber for any dropped packets that have been charged. In operation 536, the charging system 114 may continue to grant credit to the gateway component 110 (and process any refunds).

In operation 538, the traffic analyzer component 108 may send a final credit report to the charging system 114 at the end of the session. In operation 540, the charging system 114 may respond with an acknowledgement. In operation 542, the gateway component 110 may send a final credit report to the charging system 114. In operation 544, the charging system 114 may respond with an acknowledgement.

The various embodiments may also be applicable to embodiments in which the charging system is an offline charging system (e.g., an OFCS). In these embodiments, the offline charging system will perform correlation on the charge detail records (CDRs) received from both the traffic analyzer component 108 and the gateway component 110.

Figure 6:
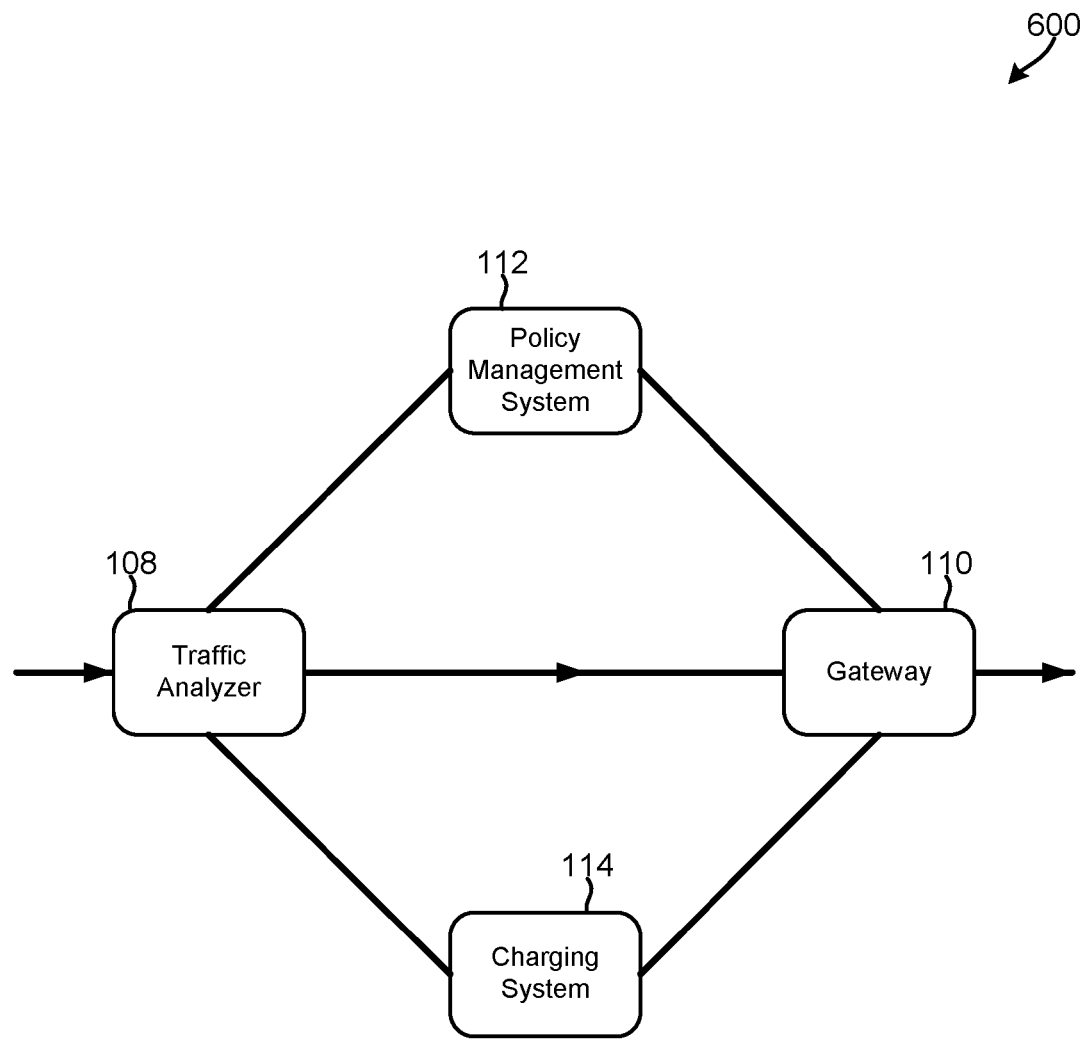
FIG. 6 is a block diagram illustrating information flows between various logical and functional components in a downlink traffic flow in accordance with an embodiment.

FIG. 6 illustrates information flows and logical and functional components in telecommunication system 600 suitable for implementing various embodiments. In the example illustrated in FIG. 6, the data arrives at the traffic analyzer component 108 first, which may correspond to either a downlink or uplink flow of traffic.

Figure 7:
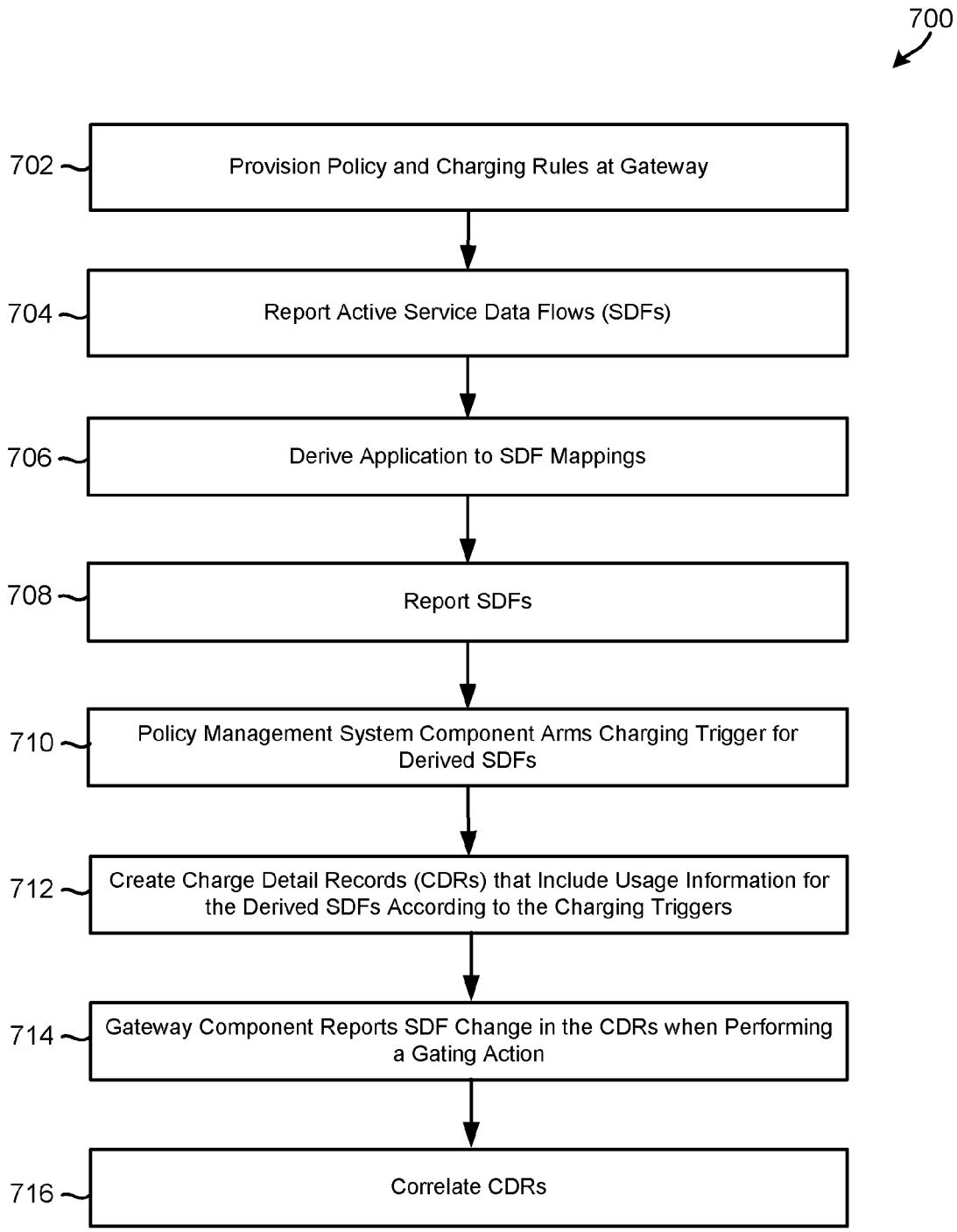
FIG. 7 is a process flow diagram illustrating an embodiment method of coordinating the reporting of charging information for a downlink traffic flow.

FIG. 7 illustrates an embodiment method 700 that may be performed by the components in telecommunication system 600 for a downlink traffic flow. In operation 702, the policy management system component 112 may provision policy and charging control rules by generating, selecting, and/or sending the rules to the gateway component 110. In operation 704, the policy management system component 112 may report active service data flows (SDFs) by sending a list of SDFs that are active on the gateway component 110 to the traffic analyzer component 108. In operation 706, the traffic analyzer component 108 may derive application-to-service data flow mappings. In operation 708, the traffic analyzer component 108 may report the service data flows, which may be used to arm charging triggers.

In operation 710, the policy management system component 112 may arm charging triggers (e.g., termination of service data flow, for reporting a Service Data Container in CDRs) for the derived service data flows (SDFs). In operation 712, the traffic analyzer component 108 may create charge detail records that include the usage information for the derived service data flows according to its configured charging triggers. In operation 714, the gateway component 110 may report a service data flow change in the charge detail records when it performs a gating action. In operation 716 the charging system 114 may correlate the charge detail records based on the service data flow information that has been captured in the traffic analyzer component 108 and the gateway component 110 charge detail records.

Figure 8:
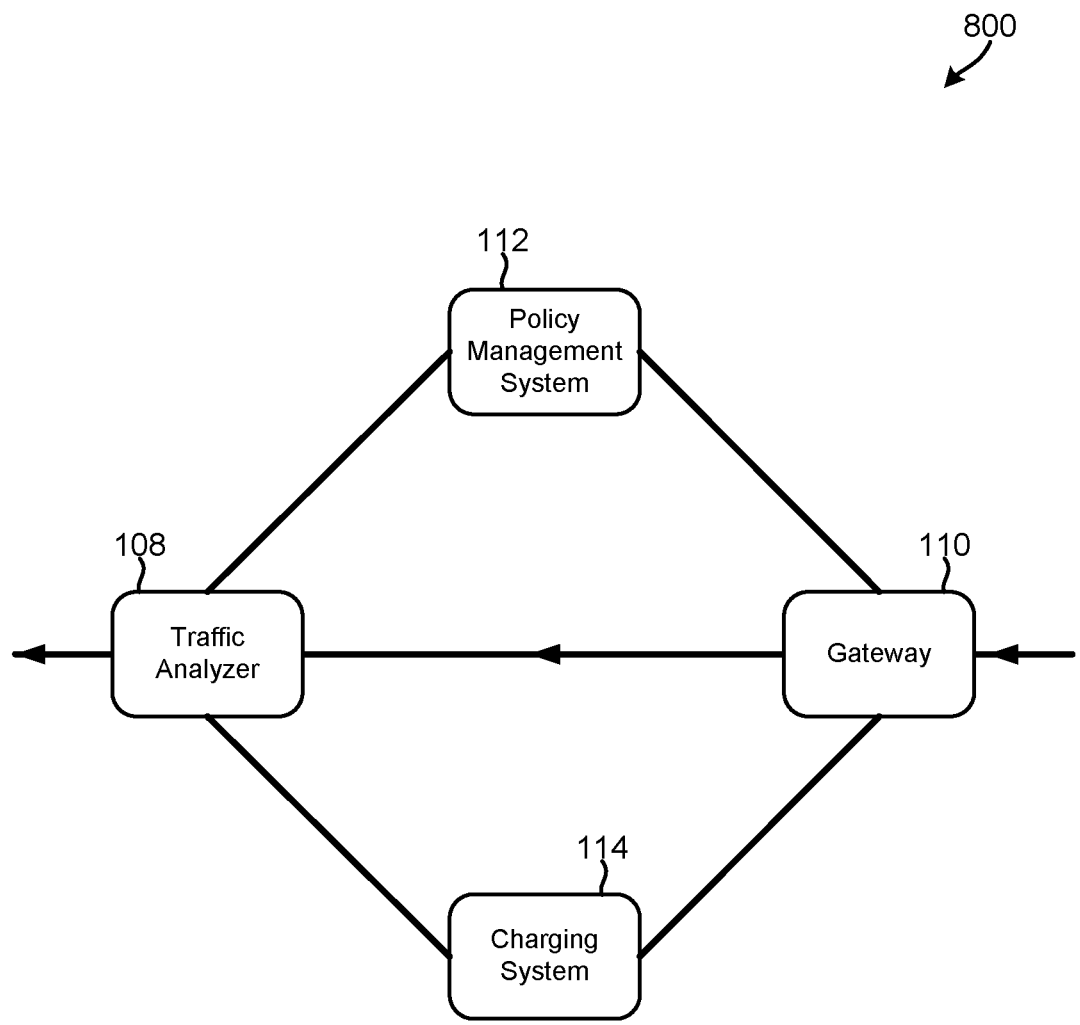
FIG. 8 is a block diagram illustrating information flows between various logical and functional components in an uplink traffic flow in accordance with an embodiment.

FIG. 8 illustrates information flows and logical and functional components in another telecommunication system 800 suitable for implementing various embodiments. In the example illustrated in FIG. 8, the data arrives at the gateway component 110 first, which may correspond to either a downlink or uplink flow of traffic.

Figure 9:
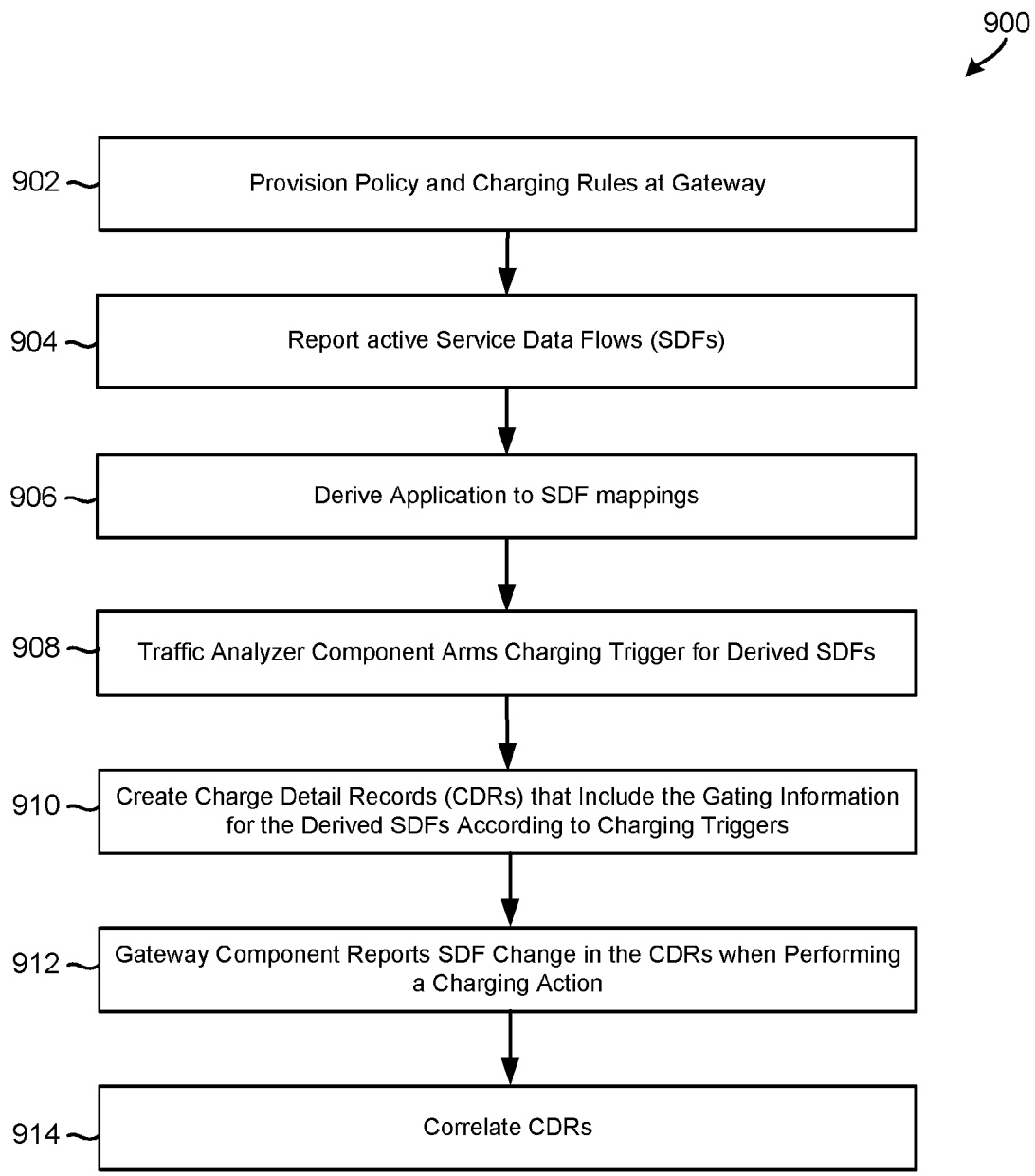
FIG. 9 is a process flow diagram illustrating an embodiment method of coordinating the reporting of charging information for an uplink traffic flow.

FIG. 9 illustrates an embodiment method 900 that may be performed by the components in telecommunication system 800 for the uplink traffic flow. In operation 902, the policy management system component 112 may provision policy and charging control rules to the gateway component 110. In operation 904, the policy management system component 112 may report to the traffic analyzer component 108 the list of SDFs active on the gateway component 110. In operation 906, the traffic analyzer component 108 may derive the application to SDF mapping. In operation 908, the traffic analyzer component 108 may arm charging triggers (e.g., termination of service data flow, for reporting a Service Data Container in CDRs) for the derived SDFs. In operation 910, the traffic analyzer component 108 may create CDRs that include the gating information for the derived SDFs according to its configured charging triggers. In operation 912, the gateway component 110 may report an SDF change in the CDRs when it performs a charging action. In operation 914, the charging system 114 may correlate the CDRs based on the SDF information that has been captured in the traffic analyzer component 108 and the gateway component 110 CDRs.

Figure 10:
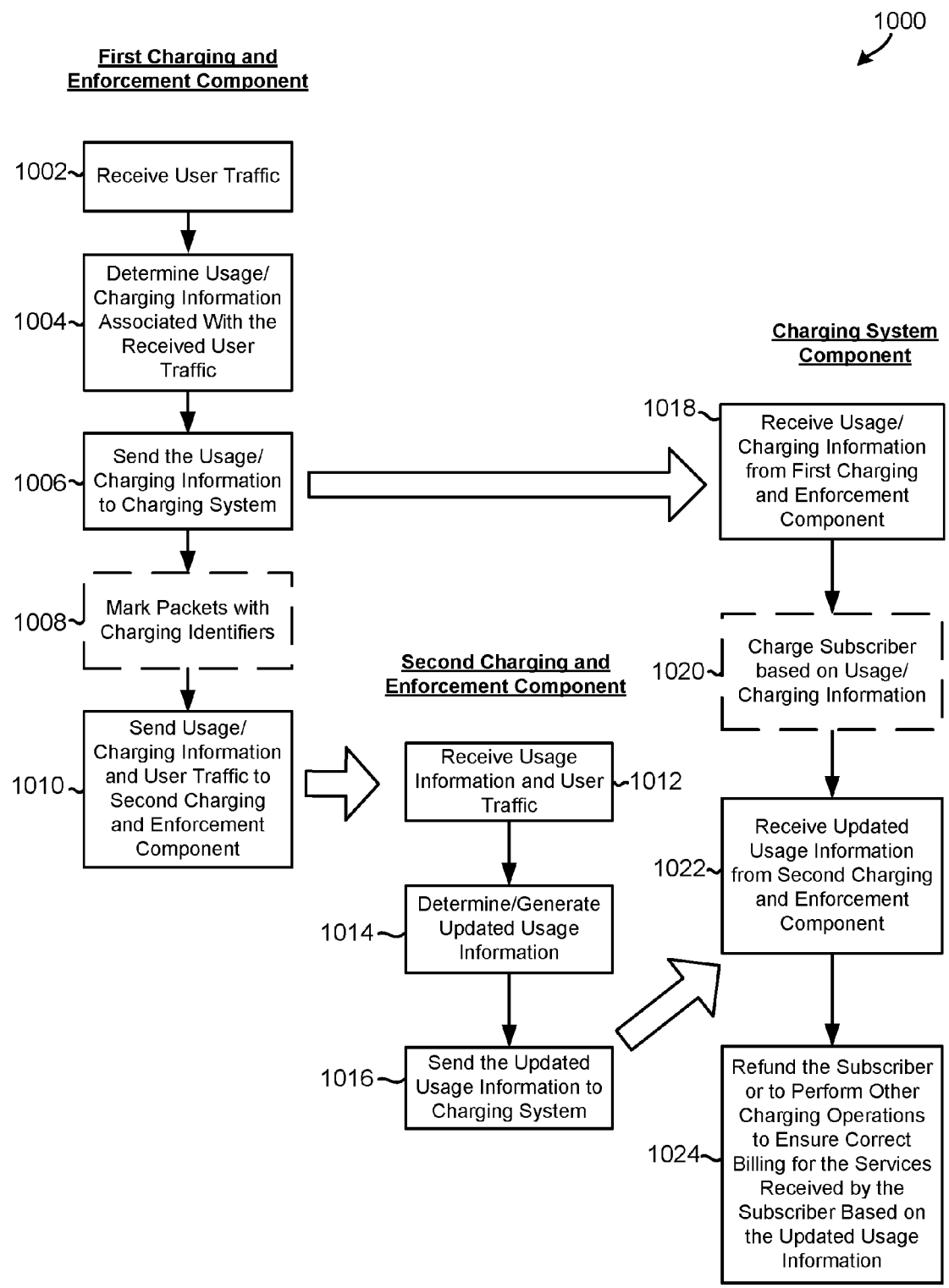
FIG. 10 is a process flow diagram illustrating an embodiment method of charging subscribers for the use of services in a telecommunications network that includes multiple charging and enforcement points.

FIG. 10 illustrates an embodiment method 1000 charging subscribers for the use of network/services in a telecommunication network that includes multiple charging and enforcement components. Method 1000 may be performed in one or more processing cores of one or more server computing devices coupled to or included in the telecommunication network.

In operation 1002, a first processing core in a server computing device that implements a first charging and enforcement component may receive user traffic. The received user traffic may include communication messages, information flows, data packets (A, B, C, and D), etc. that are sent from a user equipment device or a server coupled to an external network or the Internet.

In operation 1004, the first processing core may determine usage information associated with the received user traffic. For example, in operation 1004, the first processing core may perform application level operations (i.e., layer 7 operations) to determine whether any of the received user traffic (e.g., packets A, B, C, and D) should be blocked and/or whether the subscriber should be charged for any or all of the portions of the received user traffic. The usage information may include information regarding the use of the network/ services. The usage information may also include charging information that is suitable for use by a charging system and/or another charging and enforcement component to determine whether a subscriber has been previously charged for each of the portions of the received user traffic.

In operation 1006, the first processing core may send the usage information associated with the received user traffic to a charging system component. For example, in operation 1006, the first processing core may send usage and charging information for portions of the user traffic (e.g., packets A, B and C, but not packet D, etc.) to the charging system component. Also in operation 1006, the first processing core may send the charging system component other information, such as information suitable for reporting the usage of the network or services, obtaining quotas, and/or for performing any other online charging management operation.

In optional operation 1008, the first processing core may mark the packets included in the received user traffic with charging identifiers. For example, the first processing core may mark the "charged-for" packets (e.g., packets A, B and C) with a charging identifier (e.g., X or Y) to associate the packets for which it has sent charging information to the charging system component with a charging identifier. Alternatively, in optional operation 1008, the first processing core may determine a port or VLAN for each packet in the user traffic. In operation 1010, the first processing core may send the user traffic, and the usage/charging information associated with the received user traffic, to a second charging and enforcement component.

In operation 1012, a second processing core in a server computing device that implements a second charging and enforcement component may receive the user traffic (e.g., packets) and the usage information (e.g., charging identifiers) associated with the user traffic from the first processing core. In operation 1014, the second processing core may determine, compute, or generate updated usage/charging information based on the received usage information and the received user traffic. For example, in operation 1014, the second processing core may use charging identifiers included in the usage information to determine whether a subscriber/customer has been charged for each portion of the user traffic, implement or enforce policy and charging control rules on the user traffic to determine whether any portion of the user traffic should be dropped/blocked, and determine whether the first charging and enforcement component has previously charged the subscriber for the portions that the second processing core determines should be dropped. The second processing core may generate updated usage/charging information that includes the results of the performance of these operations. In operation 1016, the second processing core may send the updated usage information to the charging system component.

In operation 1018, a third processing core in a server computing device that implements the charging system component may receive usage/charging information from the first charging and enforcement component. In optional operation 1020, the third processing core may charge a subscriber account based on the received usage charging information (or increase or decrease subscriber balances as appropriate). In operation 1022, the third processing core may receive updated usage/charging information from the second charging and enforcement component. In operation 1024, the third processing core may take into account all the information received from the first and second processing cores to charge or refund the subscriber or to perform other charging operations to ensure correct billing for the services received by the subscriber based on the updated usage information.

Figure 11:
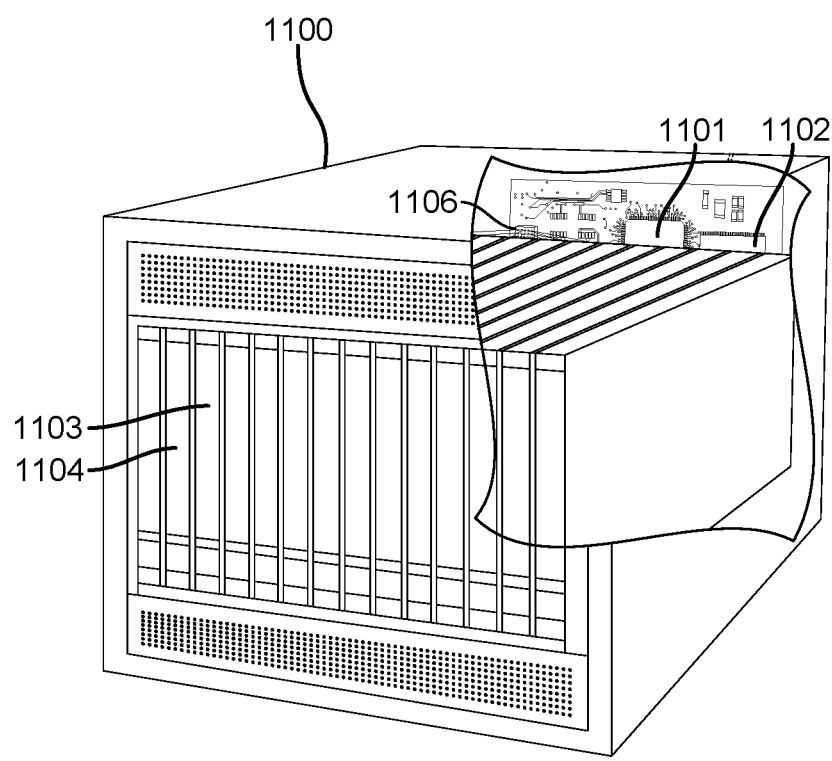
FIG. 11 is a component diagram of a server suitable for use with the various embodiments.

Various embodiments may be implemented on any of a variety of commercially available server devices, such as the server 1100 illustrated in FIG. 11. Such a server 1100 typically includes a processor 1101 or processor cores coupled to volatile memory 1102 and a large capacity nonvolatile memory, such as a disk drive 1103. The server 1100 may also include a floppy disc drive, compact disc (CD) or DVD disc drive 1104 coupled to the processor 1101. The server 1100 may also include network access ports 1106 coupled to the processor 1101 for establishing data connections with a network, such as a local area network coupled to other operator network computers and servers.

The processor 1101 may be any programmable microprocessor, microcomputer or multiple processor chip or chips that can be configured by processor-executable software instructions to perform a variety of functions, including the functions and operations of the various embodiment methods described above. Multiple processors 1101 or processor cores may be provided, such as one processor dedicated to managing network communication functions and one processor dedicated to performing the embodiment methods described above. Typically, processor-executable software applications may be stored in the internal memory 1102, 1103 before they are accessed and loaded into the processor 1101. The processor 1101 may include internal memory sufficient to store the application software instructions.

As used in this application, the terms "component," "module," "node," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, a computing device, and/or a computing system.

A number of different cellular, mobile, Wi-Fi, fixed-line, cable, and satellite communication services and standards are available or contemplated in the future, any or all of which may implement or benefit from the various embodiments described in this application. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000 ™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), integrated digital enhanced network (iden), Data Over Cable Service Interface Specification (DOCSIS), PacketCable, DSL, Broadband Forum, Metro Ethernet Forum, Wireless Broadband Alliance and various other fixed and mobile communications networks. Each of these technologies involves, for example, the transmission and reception of signaling and/or data plane information. It should be understood that any references to terminology and/or technical details related to an individual standard or technology are for illustrative purposes only, and are not intended to limit the scope of the claims to a particular communication system or technology unless specifically recited in the claim language.

The foregoing method descriptions and the process flow diagrams are provided merely as illustrative examples and are not intended to require or imply that the blocks of the various embodiments must be performed in the order presented. As will be appreciated by one of skill in the art the order of steps in the foregoing embodiments may be performed in any order. Words such as "thereafter," "then," "next," etc. are not intended to limit the order of the blocks these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. Alternatively, some steps or methods may be performed by circuitry that is specific to a given function.

The functions of the various embodiment methods may be implemented in hardware, software, firmware, or any combination thereof. If implemented in software, processor-executable instructions or code for performing the functions may be stored on a non-transitory computer-readable medium or non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of charging in a communications network in which a plurality of charging and enforcement (CaE) components operate as enforcement points for a single data communication, comprising:
   receiving, from a first CaE component, one or more usage records related to enforcement of the single data communication by the first CaE component;
   receiving, from a second CaE component, one or more usage records related to enforcement of the single data communication by the second CaE component;
   generating correlated usage records related to enforcement of the single data communication by the first CaE component and the second CaE component by using a common Service Data Flow (SDF) to correlate the one or more usage records received from the first CaE component with the one or more usage records received from the second CaE component; and
   using the correlated usage records related to enforcement of the single data communication to determine a charge value that identifies correct charges to be applied for the single data communication.

2. The method of claim 1, wherein the first CaE component and the second CaE component operate at different communication architecture layers.

3. The method of claim 2, wherein:
   the first CaE component operates at an application layer; and
   the second CaE component operates at an Internet protocol layer.

4. The method of claim 1, wherein receiving the one or more usage records related to enforcement of the single data communication by the first CaE component comprises receiving a usage record that includes a SDF identifier.

5. The method of claim 1, wherein receiving the one or more usage records related to enforcement of the single data communication by the first CaE component comprises receiving application-to-service data flow mapping information.

6. The method of claim 1, further comprising:
   receiving, in the second CaE component, information identifying an SDF that is active on the first CaE component; and
   generating, in the second CaE component, usage information based on the received information identifying the SDF that is active on the first CaE component,
   wherein receiving the one or more usage records related to enforcement of the single data communication by the second CaE component comprises receiving the usage information from the second CaE component.

7. The method of claim 1, wherein the first CaE component is one of:
   a traffic detection function component; and
   a policy and charging enforcement function component.

8. A server computing device, comprising:
   a processor configured with processor-executable instructions to perform operations comprising:
      receiving, from a first CaE component of a plurality of CaE components that operate as enforcement points for a single data communication, one or more usage records related to enforcement of the single data communication by the first CaE component;
      receiving, from a second CaE component of the plurality of CaE components that operate as enforcement points for the single data communication, one or more usage records related to enforcement of the single data communication by the second CaE component;
      generating correlated usage records related to enforcement of the single data communication by the first CaE component and the second CaE Component by using a common Service Data Flow (SDF) to correlate the one or more usage records received from the first CaE component with the one or more usage records received from the second CaE component; and
      using the correlated usage records related to enforcement of the single data communication to determine a charge value that identifies correct charges to be applied for the single data communication.

9. The server computing device of claim 8, wherein the first CaE component and the second CaE component operate at different communication architecture layers.

10. The server computing device of claim 9, wherein:
    the first CaE component operates at an application layer; and
    the second CaE component operates at an Internet protocol layer.

11. The server computing device of claim 8, wherein the processor is configured with processor-executable instructions to perform operations such that receiving the one or more usage records related to enforcement of the single data communication by the first CaE component comprises receiving a usage record that includes a SDF identifier.

12. The server computing device of claim 8, wherein the processor is configured with processor-executable instructions to perform operations such that receiving the one or more usage records related to enforcement of the single data communication by the first CaE component comprises receiving application-to-service data flow mapping information.

13. The server computing device of claim 8, wherein:
    the processor is configured with processor-executable instructions to perform operations further comprising:
       receiving in the second CaE component information identifying an SDF that is active on the first CaE component; and
       generating in the second CaE component usage information based on the received information identifying the SDF that is active on the first CaE component; and
    the processor is configured with processor-executable instructions to perform operations such that receiving the one or more usage records related to enforcement of the single data communication by the second CaE component comprises receiving the usage information from the second CaE component.

14. The server computing device of claim 8, wherein the first CaE component is one of:
    a traffic detection function component; and
    a policy and charging enforcement function component.

15. A non-transitory computer readable storage medium having stored thereon processor-executable software instructions configured to cause a processor to perform operations comprising:
  receiving, from a first CaE component of a plurality of CaE components that operate as enforcement points for a single data communication, one or more usage records related to enforcement of the single data communication by the first CaE component;
  receiving, from a second CaE component of the plurality of CaE components that operate as enforcement points for the single data communication, one or more records related to enforcement of the single data communication by the second CaE component;
  generating correlated usage records related to enforcement by the first CaE component and the second CaE component by using a common Service Data Flow (SDF) to correlate the one or more usage records received from the first CaE component with the one or more usage records received from the second CaE component; and
  using the correlated usage records related to enforcement of the single data communication to determine a charge value that identifies correct charges to be applied for the single data communication.

16. The non-transitory computer readable storage medium of claim 15, wherein:
  the first CaE component operates at an application layer; and
  the second CaE component operates at an Internet protocol layer.

17. The non-transitory computer readable storage medium of claim 15, wherein the stored processor-executable software instructions are configured to cause a processor to perform operations such that receiving the one or more usage records related to enforcement of the single data communication by the first CaE component comprises receiving a usage record that includes a SDF identifier.

18. The non-transitory computer readable storage medium of claim 15, wherein the stored processor-executable software instructions are configured to cause a processor to perform operations such that receiving the one or more usage records related to enforcement of the single data communication by the first CaE component comprises receiving application-to-service data flow mapping information.

19. The non-transitory computer readable storage medium of claim 15, wherein:
  the stored processor-executable software instructions are configured to cause a processor to perform operations further comprising:
    receiving in the second CaE component information identifying an SDF that is active on the first CaE component; and
    generating in the second CaE component usage information based on the received information identifying the SDF that is active on the first CaE component; and
  the stored processor-executable software instructions are configured to cause a processor to perform operations such that receiving the one or more usage records related to enforcement of the single data communication by the second CaE component comprises receiving the usage information from the second CaE component.

20. The non-transitory computer readable storage medium of claim 15, wherein the first CaE component is one of:
  a traffic detection function component; and
  a policy and charging enforcement function component.

* * * * *